United States Patent

[11] 3,570,518

| [72] | Inventor | Richard W. Hatch, Jr.<br>Foxboro, Mass. |
|---|---|---|
| [21] | Appl. No. | 834,855 |
| [22] | Filed | June 19, 1969 |
| [45] | Patented | Mar. 16, 1971 |
| [73] | Assignee | The Foxboro Company<br>Foxboro, Mass. |

[54] FLUIDIC TIMER
1 Claim, 1 Drawing Fig.

[52] U.S. Cl.................................................... 137/81.5,
235/201
[51] Int. Cl.................................................... F15c 3/04
[50] Field of Search............................................ 137/81, 5,
624.18 (in part), 624.2 (in part); 235/201
(w.b.,m.e.,sens.)

[56] References Cited
UNITED STATES PATENTS

| 2,985,183 | 5/1961 | Peatross..................... | 137/86 |
| 3,104,810 | 9/1963 | Lupfer....................... | 235/200WB |
| 3,238,959 | 3/1966 | Bowles....................... | 137/81.5 |
| 3,292,648 | 12/1966 | Colston...................... | 137/81.5X |
| 3,292,852 | 12/1966 | Shinskey..................... | 235/200WB |
| 3,303,999 | 2/1967 | Mamy........................ | 137/625.66X |
| 3,331,379 | 7/1967 | Bowles....................... | 137/81.5 |
| 3,335,950 | 8/1967 | Tal et al..................... | 137/625.66UX |
| 3,459,206 | 8/1969 | Dexter....................... | 137/81.5 |
| 3,489,180 | 8/1970 | Filippi et al................. | 137/625.66 |

*Primary Examiner*—Samuel Scott
*Attorney*—Lawrence H. Poeton

ABSTRACT: A fluid system for establishing time periods based on fluid pressure comparisons, in which a fluid resistance-capacity system is used as a time function, controlled by a fluidic flip-flop system as applied through a pressure differential control unit to a pressure differential comparison unit.

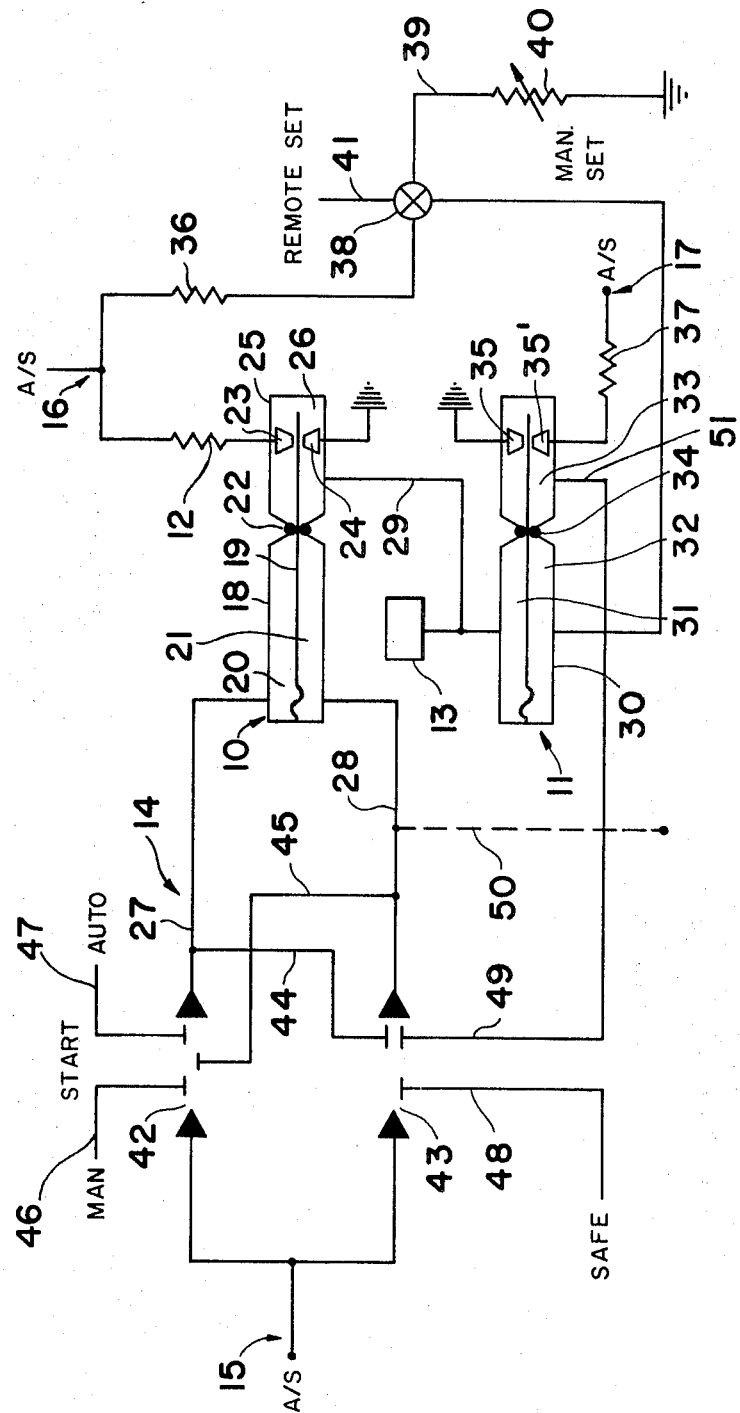

FLUIDIC TIMER

This invention relates to timing device and has particular reference to a timing device in the form of a fluidic system.

In modern instrumentation for process and/or energy control, fluidic systems are useful in many applications. Their simplicity in terms of unit parts, their safety and capability of operation by air flow and pressure, make them desirable in many modern system functions. Further, they lend themselves to new systems of structure and to advances in the direction of miniaturization.

Such fluidic systems need continued improvement in fluidic elements and assemblies in order to make new systems practicable. Of such elements and assemblies, timers are increasingly important as needs for time measured controls and operations increase.

This invention provides for example in an air system, a new and useful fluidic timer, in a system of repeatable time period establishment on an automatic operational and automatic resettable basis, for use in batch-type timing applications or in a series of time programmed control or operational steps.

In this invention a fluid resistance-capacity system is automatically loaded and discharged. The time period is the time taken to load the resistance-capacity system to a point of pressure equalization in a pressure matching device in the form of a differential pressure nozzle-baffle device. Another differential pressure device is used as a control unit to initiate the loading of the resistance-capacity system. Both of these differential pressure devices are structured according to disclosure in patent application to Prescott et al. Ser. No. 772,787, filed Nov. 1, 1968 and entitled Pressure Device Having Layered Construction and Pivoting Seal With Operator. The abstract of the disclosure of this patent application is as follows:

"In a multilayer sandwich type of construction, an operator activated by at least one pressure chamber is brought through a sealing configuration which also provides for pivoting of the operator; the operator itself is formed from a layer of the sandwich construction and the sealing at the operator pivot is formed from sealing layers of the sandwich construction; the operator layer may be backed by a resilient sheet layer for sealing the pressure chamber actuating the operator; this construction may be readily adapted to a plurality of pressure chambers employed in conjunction with motion-sensing devices, or alternatively weight and springs, to perform the functions of alarms, relays, repeaters, amplifiers, and a variety of other pneumatic devices."

The timer system of this invention is operated through a fluidics logic flip-flop system. As an example, a flip-flop system utilizing laminar flow diffusion type logic units is set forth herein.

Other objects and advantages of this invention will be in part apparent and in part pointed out hereinafter and in the accompanying drawing, wherein:

The drawing is a schematic illustration of a fluidic timer system according to this invention.

As in the drawing, a fluidic timer system illustrative of this invention comprises a differential pressure nozzle-baffle control unit 10, a differential pressure nozzle-baffle pressure matching unit 11, a fluidics resistance-capacity time system comprising a resistance 12 and a capacity 13, and a fluid logic flip-flop system 14 as the operational unit for the timer system.

Three air supply systems are used. One, indicated at 15, supplies the flip-flop system 14 and part of the control unit 10. Another, indicated at 16, supplies the resistance-capacity system 12, 13, through the control unit 10 to the comparison unit 11. The third, indicated at 17, supplies a control signal back to the flip-flop unit 14, as influenced by the comparison unit 11.

The control unit 10, like one form in the patent application referenced hereinbefore, comprises a housing 18, with a diaphragm 19 therein forming two chambers 20 and 21. The diaphragm 19 extends out of the housing 18, through a sealed pivot area 22 so as to be movable with respect to nozzles 23 and 24 in an outer housing 25 with a single chamber 26 therein. This diaphragm movement with respect to nozzles 23 and 24 is in response to differential pressure situations as between chambers 20 and 21 in the housing 18.

The output of the flip-flop unit 14 is in the form of two passages 27 and 28, respectively connected to control unit chambers 20 and 21. Air supply 16 is fed into control unit chamber 26, through the time resistor 12 and the nozzle 23. Nozzle 24 leads out of the control unit chamber 26 to atmosphere, and a further fluid connection 29, from the control unit chamber 26, leads to the comparison unit 11, with time capacity 13 as a side pocket from the connection 29 between the control unit 10 and the comparison unit 11.

The comparison unit 11 also has a differential pressure housing 30 with a diaphragm forming two chambers 31 and 32 and extending into an outer housing 33 through a pivot seal area 34, for movement with respect to nozzles 35 and 35' in the outer housing 33.

The comparison unit chamber 31 receives the time passage 29 from the control unit 10, and chamber 32 receives a supply connection from air supply 16, through a resistance 36 which is essentially equal to and parallel with time resistor 12. The nozzle 35 leads from comparison unit outer housing 33 to atmosphere, and housing 33 is supplied from air supply 17, through a nozzle resistance 37.

The connection from air supply 16 to chamber 32 in the comparison unit 11 is provided with a selector switch 38. In one position of this switch, the air supply 16 and the comparison unit chamber 32 are both connected to atmosphere through a passage 39, by way of an adjustable manual set resistance 40. In the other position of switch 38, both the air supply 16 and the atmosphere passage 39 are cut off from comparison unit chamber 32 which, in such case, receives its pressure from a 'remote set' passage 41 from whatever source is pertinent to a particular application. The passage 39 to atmosphere reduces the air supply 16 pressure to a value suitable for the comparison unit chamber 32 as a reference or set pressure, and the resistance 40, being adjustable, thus can vary the time necessary to achieve matched pressures as between the comparison unit chambers 31 and 32, thus, in the manual set situation, establishing the time period of the overall timer as related to the resistance-capacity system 12, and 13.

The control unit 10 thus accomplishes a gate function in terms of loading and emptying the capacity 13 and thus, effectively, loading and emptying the resistance-capacity time system from control unit outer housing 25 by way, respectively, of passage 29 and nozzle-to-atmosphere 24.

The flip-flop unit 14 comprises a pair of diffusion fluid gates 42 and 43 in parallel from the supply 15 and leading respectively to flip-flop output passages 27 and 28.

The output of flip-flop gate 42 has a crossfeed signal passage 44 as an input control signal passage to flip-flop gate 43. Similarly a crossfeed control passage 45 leads from the output of gate 43 to a control for gate 42.

Flip-flop gate 42 is provided with a manual control signal input 46, and an automatic control signal input 47. Flip-flop gate 43 has a safety control signal input 48, and a control signal input 49 from the supply 17, as influenced by the comparison unit 11. An output signal for the overall system may be taken from the flip-flop 43 output, as indicated by dotted line 50. As will be seen hereinafter, in the example shown herein, a logic zero in the output of the flip-flop gate 43, indicates the overall system is in condition to start a new timing cycle and thus, also indicates the end of a previous time cycle.

In the stabilized condition of the timing system shown in the drawing, the switch 38 at the right of the drawing is established, for example, at manual set, with a flow to atmosphere through resistances 36 and 40 from supply 16. If the remote set situation were in force, by the position of switch 38, the supply 16 and the flow to atmosphere through resistance 39 would both be cut off from the comparison unit 11, and a reference pressure established in chamber 30 from the remote set input 41 to whatever value is desired or available therefrom.

In the instance hereinafter, the stabilized condition of the timer, before a timing sequence or cycle is initiated, involves the manual set system of the resistance 40 as being in the overall system.

In this situation, there is no control signal applied to the flip-flop gate 42. Thus, this gate has an output signal, which crossfeeds to close off the gate 43. Thus there is no crossfeed to gate 42 through passage 45. Neither the manual nor the automatic control input to gate 42 is activated. The safety control input 48 to gate 43 is off, and the feedback control 49 to gate 43 is effectively off because, as will be seen hereinafter, of resistor 37 and bleedoff of supply 17 through resistor 37 and through the comparison unit 11 outer chamber nozzle 35 to atmosphere.

In this stabilized condition of the overall system there is a pressure applied to chamber 20 of the control unit 10, through flip-flop gate 42. Since flip-flop gate 43 is closed by crossfeed through passage 44, there is no significant pressure in control unit chamber 21. Accordingly, the diaphragm 19 is pivoted at 22 and the nozzle 23 is closed by the diaphragm. Thus, the time system of resistance 12 and capacity 13 is not operative because no fluid can reach the capacity 13. Nozzle 24 is open, so capacity 13 is at atmospheric or ambient pressure.

In this stabilized condition, the situation of the comparison unit 11 is that chamber 31 is at atmosphere, or ambient, pressure, chamber 32 is at a reference pressure from the supply 16 as influenced by the manual set 40 system to atmosphere. Thus, the diaphragm is so pivoted as to open nozzle 35 and close nozzle 35' and the supply 17 is closed off and there is no feedback signal to flip-flop gate 43.

Thus, nozzle 35' like control unit nozzle 23, is closed off so no air is lost from their respective supplies while the overall system is in stabilized, waiting condition.

In the operation of the overall system, a start signal is applied to flip-flop gate 42. This closes gate 42 and opens gate 43. Pressure thus applied to control unit chamber 21 moves the diaphragm 19 to open nozzle 23 and close nozzle 24. Supply 16 is thus connected through the resistance-capacity system 12 and 13 to chamber 31 of the comparison unit 11, and the time period starts.

When the pressure in chamber 31 builds up to match the set pressure in chamber 32, the comparison unit diaphragm opens nozzle 35' and closes nozzle 35. This applies a signal from housing 33 through a passage 51 to feedback control 49 in the flip-flop gate 43. This action terminates the time period and resets the flip-flop 14. The control and comparison units are reset to a stabilized condition, ready for initiation of another time period cycle.

Tests have indicated that if the air supply changes, the time period does not, providing a further advantage to this invention.

This invention therefore provides a new and useful timing device in the form of a fluidic system based on filling a fluid resistance-capacity system to a pressure matching time period terminal point, and thereafter automatically discharging the resistance-capacity system and resetting the timing device preparatory to initiation of a new time period cycle.

As many embodiments may be made of the above invention, and as changes may be made in the embodiment set forth without departing from the scope of the invention, it is to be understood that all matter hereinbefore set forth and in the accompanying drawings is to be interpreted as illustrative only and not in a limiting sense.

I claim:

1. An automatic timer fluidics system comprising:

a differential pressure nozzle-baffle control unit comprising a first housing, a pivot seal centrally of said housing, dividing said housing into two chambers which are pressure isolated from each other by said pivot seal, a diaphragm across one of said chambers and through said pivot seal into the other of said chambers, said diaphragm dividing said one of said chambers into two subchambers pressure isolated from each other and dividing said other of said chambers into two subchambers which are pressure connected, whereby pressure differential in said isolated subchambers results in movement of said diaphragm about said pivot seal as a pivot, a supply nozzle and a bleed nozzle in said other chamber located for oppositely variable restriction by said diaphragm as it is pivoted by said differential pressure, and outlet from said other chamber, and a separate control pressure input to each of said isolated subchambers;

a differential pressure nozzle-baffle pressure matching unit comprising a second housing, a second pivot seal centrally of said second housing, dividing said second housing into a second two chambers which are pressure isolated from each other by said second pivot seal, a second diaphragm across one of said second chambers and through said second pivot seal into the other of said second chambers, said second diaphragm dividing said one of said second chambers into two subchambers, pressure isolated from each other and dividing said other of said second chambers into two subchambers which are pressure connected, whereby pressure differential in said second isolated subchambers results in movement of said second diaphragm about said second pivot seal as a pivot, a supply nozzle and a bleed nozzle in said second other chamber located for oppositely variable restriction by said second diaphragm as it is pivoted by said second differential pressure, an outlet from said second other chamber, and a separate pressure connection to each of said second isolated subchambers;

a time pressure connection between said outlet from said first other chamber and one of said pressure connections to one of said second isolated subchambers a pressure capacity element included in said time pressure connection;

a first pressure supply input, a first connection from said first pressure supply input to said supply nozzle in said first other chamber, a restriction in said first connection, a second connection from said first pressure supply input to the other of said pressure connections of said second isolated subchambers, a restriction in said second connection, a switch in said second connection downstream of said restriction, a manual set bleed connection and a remote set input connection to said switch whereby said switch is selectively operable to connect said first pressure supply simultaneously to said other of said second isolated subchambers and to said manual set bleed connection to the exclusion of said remote set, and said remote set to the exclusion of said first pressure supply and said manual set bleed connection; and a second pressure supply input, a connection from said second pressure supply input to said supply nozzle of said second other chamber, a restriction in said second pressure supply connection, and a fluidic flip-flop unit, a pair of outputs from said flip-flop unit, an individual control connection from one of said flip-flop outputs to one of said isolated subchambers of said nozzle-baffle control unit, an individual control connection from the other of said flip-flop outputs to the other of said control unit isolated subchambers, and a control connection to said flip-flop unit from said outlet from said second other chamber.